June 9, 1942.     F. E. BEST     2,285,800

ROLLER BEARING

Filed Sept. 6, 1940

*Frank Ellison Best*

INVENTOR.

Patented June 9, 1942

2,285,800

UNITED STATES PATENT OFFICE 2,285,800

ROLLER BEARING

Frank Ellison Best, Indianapolis, Ind.

Application September 6, 1940, Serial No. 355,629

10 Claims. (Cl. 308—205)

My invention is related to roller bearings and particularly to that type of roller bearing comprising pairs of opposed conical or tapered rollers abutting at their larger ends in rolling contact, retained within opposed conical races, and is a continuation in part of my co-pending application, for Roller bearing, Serial No. 169,683, filed October 18, 1937, without prejudice to my filing another continuation in part application covering matter cancelled from said application by examiner's requirement for division.

The principal objects hereof are as follows:

First, to provide a roller bearing of the class described in which the rollers are retained both in proper spaced relation and also in axial alignment by gear means thus dispensing with the ordinary spacing and aligning cage or other annular spacing and axial aligning means.

Second, to align said bearings endwise by flange means and by combinations of flange means with endwise thrust means on the adjacent portions of end-to-end abutting paired conical or tapered rollers.

Third, to provide a roller bearing in which all engagements between relatively moving elements are practically reduced to rolling contacts thus practically eliminating sliding friction, present in former bearings, therefrom.

Fourth, to thus provide a roller bearing of long life at high velocities and under heavy loads subjected to severe vibration and heavy shocks and at temperatures and in fluids where lubrication is impossible.

Fifth, to provide such a bearing of combined radial and axial thrust type.

Other and more specific objects of the invention will become apparent from a study of the following description in connection with the accompanying drawing.

In the drawing, Fig. 1 is a view in longitudinal axial section, substantially on broken line 1—1 of Fig. 2, of a combined radial and end thrust roller bearing constructed in accordance with this invention.

Figure 1:
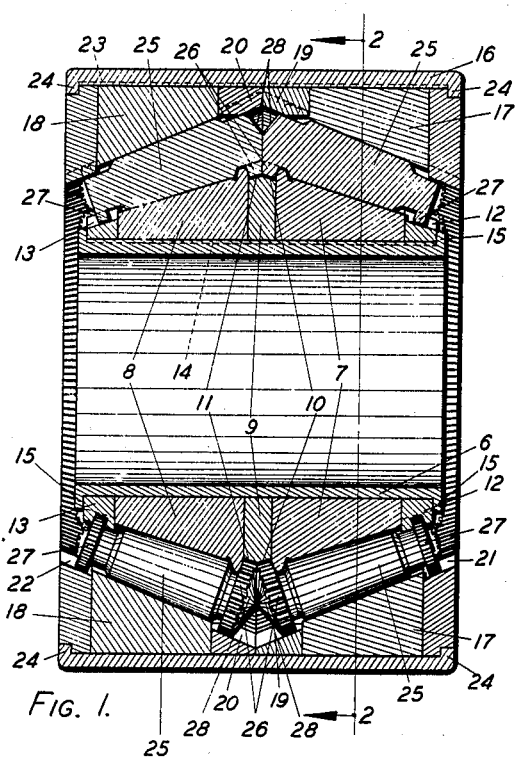
Figure 2:
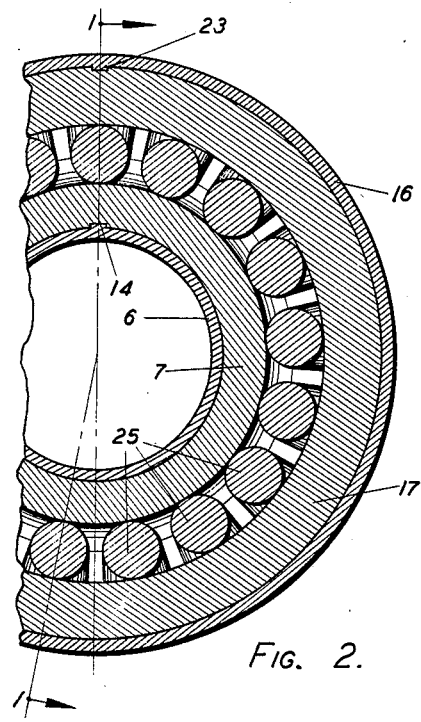
Fig. 2 is a fragmentary transverse sectional view of the same taken substantially on broken line 2—2 of Fig. 1.
Figure 3:
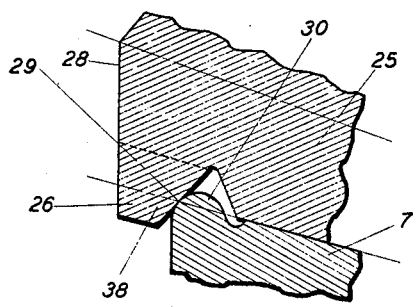
Fig. 3 is a fragmentary sectional view on an enlarged scale showing aligning flanges on a roller and race means cooperating in the endwise alignment of said roller.

Figs. 1, 2 and 3 show a combined radial and end thrust type roller bearing comprising a tubular center member 6 having two bearing race members 7 and 8 secured thereon. A spacer member 9 is provided between the two race members 7 and 8. Two gears 10 and 11 are provided on the peripheral portion of the spacer member 9. Two other gears 12 and 13 are provided at the respective outer ends of the race members 7 and 8. The two race members 7 and 8, the spacer member 9, and the two gears 12 and 13 are all secured to the center tube 6 by a key member 14 which may be integral with the center tube 6. Also the end portions of the center tube 6 are expanded or turned outwardly, as indicated by 15, to engage with the gears 12 and 13 and prevent longitudinal movement on the center tube 6 of the parts assembled thereon.

The outer portion of the bearing comprises an outer cylinder 16 supporting therein two spaced-apart bearing race members 17 and 18, two medially disposed ring gear members 19 and 20, and two other ring gear members 21 and 22. The ring gear members 19 and 20 are positioned between the two race members 17 and 18 and the ring gear members 21 and 22 are positioned adjacent the respective outer ends of the two race members 17 and 18. A key 23 secures all of the above described members which are positioned within the outer cylinder 16 against rotation relative to said cylinder and the ends of the outer cylinder 16 are crimped inwardly over the ring gear members 21 and 22, as indicated by 24 thus completing the assembly of the several parts within the outer cylinder 16.

The outer surfaces of the inner race members 7 and 8 and the inner surfaces of the outer race members 17 and 18 are all of conical shape as shown and are suitably positioned in opposed relation to receive therebetween a plurality of rollers 25. The rollers 25 are arranged in pairs with the two rollers of each pair positioned in the same axial plane of the bearing. The rollers 25 are preferably tapered to the common apexes of the races as shown, and are positioned with their larger ends adjacent each other. Gear or gear wheels 26 are provided on the larger ends of the rollers 25 and other gear or gear wheels 27 are provided on the smaller ends of such rollers. The pitch lines of the gear wheels 26 and 27 would coincide with the conical surface of the tapered rollers 25 if said surfaces were projected sufficiently beyond the ends of the rollers 25. The gear wheels 26 mesh with the inner gears 10 and 11 and the outer ring gears 19 and 20. The gear wheels 27 mesh with the gears 12 and 13 and the ring gears 21 and 22. The gear wheels 26 are preferably integral with the rollers 25 and said gear wheels 26 preferably have cone surfaces 28 on the adjacent ends thereof which abut against each other and provide additional rolling contact between each pair of rollers 25. The end thrust toward each other, of the two rollers 25 of each pair is thus, to a very large degree, carried by the cone surfaces 28, which preferably provide full rolling contact. Movement of the rollers 25 outwardly away from each other is restrained by engagement of the outer faces 29 of the teeth of gear wheels 26 with annular external flanges 30 rigidly connected with the inner end portions of the race members 7 and 8. This construction is shown on a larger scale in Fig. 3.

Flanges 30 contact mating flanges 38 which, in this instance, preferably, serve additionally as teeth of gear wheel 26, said flanges 30 and 38 abutting in substantially line engagement at 29, the lines of said engagement being the intersection, with said abutting flange faces, of the projected conical surfaces of said rollers 25 and said race members 7 respectively.

It will be observed that the respective flanges preferably extend both axisward and peripheryward beyond said lines 29 of engagement in both said rollers 25 and said race 7 at such an angle and of such a profile as to afford desirable rolling contact.

The two rollers 25 of each pair are thus in end-to-end rolling contact with each other through the medium of the cone surface 28 and are supported against endwise movement in both directions by engagement of flanges 30 and 38. This holds the rollers very accurately in longitudinal alignment which is exceedingly important in a roller bearing employing tapered or conical rollers.

The gear means holds the rollers in exact axial alignment and in spaced annular relation and the said flanges and end cones cooperate to hold them in correct endwise alignment thus obviating the use of a cage and thereby reducing friction and wear to a minimum.

The bearings hereinbefore described are preferably assembled under pressure and since they are substantially free from sliding friction they may be successfully operated dry, without lubrication. In fact, they are designed especially to operate dry as in a vacuum.

The elimination of cages and the ill effects of the inertial reaction to shock and vibration of cages, make these most desirable types of bearings for many uses.

The foregoing description and accompanying drawings clearly disclose a preferred embodiment of my invention but it is to be understood that this disclosure is merely intended to be illustrative and that such changes are contemplated and may be made as are fairly within the scope and spirit of the following claims.

For instance, only three of the four race gears shown in communication with the roller gears are essential to afford combined roller spacing and roller alignment. Thus only any three of the four gears 10, 12, 19 and 21 or any three of the four gears 11, 13, 20 and 22 are required to afford proper spacing and axial alignment.

Having thus described my invention, what I claim as new and desire to secure by Letters Patent of the United States of America is:

1. In a roller bearing comprising pairs of opposed conical rollers with their larger ends abutting in rolling contact, said rollers being retained and axially aligned in mating conical races, the combination of a plurality of spaced-apart gears on each of said rollers with mating race gears, said spaced-apart arrangement of said roller gears with said race gears cooperating in the maintenance of the alignment of the axes of said rollers, constituting each said pair, in an axial plane of said races, and cooperating rolling contact means on said rollers and said races maintaining correct endwise positioning of said rollers.

2. In a roller bearing comprising pairs of opposed conical rollers with their larger ends abutting in rolling contact, said rollers being retained and axially aligned in mating conical races, the combination of gears at the two ends of each roller with mating race gears, said gears and the arrangement of said gears providing and maintaining axial alignment of the axes of said rollers, constituting each said pair, in an axial plane of said races, and cooperating rolling contact means on said rollers and said races maintaining correct endwise positioning of said rollers.

3. In a roller bearing comprising pairs of opposed conical rollers with their larger ends abutting in rolling contact, said rollers being retained and axially aligned in mating conical races, the combination, of gears near the two ends of each roller, with mating race gears, said gears and the arrangement of said gears providing and maintaining axial alignment of the axes of said rollers, constituting each said pair, in an axial plane of said races, and cooperating rolling contact means on said rollers and said races maintaining correct endwise positioning of said rollers.

4. In a roller bearing comprising pairs of opposed conical rollers with their larger ends abutting in rolling contact therebetween, said rollers being retained, annularly spaced and axially aligned in mating conical races, the combination, of gears near the two ends of each roller, with mating race gears, said arrangement of said gears providing combined annular spacing of said rollers and axial alignment of the axes of said rollers, constituting each said pair, in an axial plane of said races, and cooperating rolling contact means on said rollers and said races maintaining correct endwise positioning of said rollers.

5. In a roller bearing comprising pairs of opposed conical rollers having conical bearing surfaces, the larger ends of said rollers being provided with end bearing surfaces abutting in rolling contact, said rollers being retained, annularly spaced and axially aligned in mating internal and external conical races, by means of roller and race gears combined with said rollers and races respectively, the combination, with said roller gears adapted to cooperation with said race gears in the maintenance of annular spacing of said rollers within said races and also in the maintenance of alignment of the axes of said rollers, constituting each said pair, in an axial plane of said races, of endwise aligning flanges, on said rollers near the larger ends thereof cooperating with said end bearing surfaces of the said abutting rollers, in the endwise alignment of said rollers, said flanges having flange bearing surfaces thereof extending axisward and peripheryward across the projected conical surfaces of said rollers, cooperating with and forming rolling contact with mating flange bearing surfaces on mating flanges of said races, said flange bearing surfaces of said races, extending axisward and peripheryward across the projected conical surface of said races, said flange bearing surfaces on said rollers and said races being so formed as to produce rolling contact therebetween along the intersection of said projected conical surfaces of said rollers and races with said flange bearing surfaces.

6. In a roller bearing comprising pairs of opposed conical rollers with their larger ends abutting in rolling contact therebetween, said rollers being retained by internal and external mating conical races and annularly spaced and axially aligned relative to said races by internal and external mating race gears, said rollers also being aligned endwise by the cooperation of mating roller and race flanges, said internal and external conical races and race gears constituting annular rings, the combination with said internal and external conical races and race gears of internal and external sleeves respectively annularly positioning and endwisely retaining the said internal and external race and gear parts in rigid assembly.

7. In a roller bearing the combination of elements comprising housing and race means; bearing rollers operatively disposed in said housing and race means; flanges on said rollers and said race means cooperating in the endwise alignment of said rollers, relative to said race means, said flanges on said respective rollers and race means providing substantially rolling contact therebetween; a plurality of gear wheels fixedly connected with each of the said rollers; and gears fixed relative to the said race members and meshing with the said gear wheels.

8. In a roller bearing, the combination of elements comprising housing and race means providing two annular coaxial inclined bearing chambers positioned with their larger ends adjacent to each other and their smaller ends toward the respective ends of the bearing; tapered bearing rollers positioned in pairs in said bearing chambers with their larger ends adjacent to each other and the axes of the two rollers of each pair positioned substantially in the same axial plane of the bearing; endwise thrust surfaces on the adjacent portions of the two rollers of each pair positioned in abutting relation and providing substantially rolling contact therebetween; flanges on said rollers and race means providing substantially rolling contact therebetween, said abutting endwise thrust surfaces cooperating with said flanges in the endwise alignment of said rollers; a plurality of spaced-apart gear wheels fixedly connected with each of the said rollers; a plurality of ring gears fixed relative to an outside race member and another gear fixed relative to an inside race member meshing with the said gear wheels and thus providing axial alignment and annular spaced relation of said rollers.

9. In a roller bearing, the combination of elements comprising housing and race means providing two annular coaxial inclined bearing chambers positioned with their larger ends adjacent to each other and their smaller ends toward the respective ends of the bearing; tapered bearing rollers positioned in pairs in said bearing chambers with their larger ends adjacent to each other and the axes of the two rollers of each pair positioned substantially in the same axial plane of the bearing; endwise thrust surfaces on the adjacent portions of the two rollers of each pair positioned in abutting relation and providing substantially rolling contact therebetween; flanges on said rollers and race means extending axisward and peripheryward beyond the projected bearing surface of said respective rollers and race means and providing substantially rolling contact therebetween, said abutting endwise thrust surfaces cooperating with said flanges in the endwise alignment of said rollers; ring gear means fixedly connected with said outer race member adjacent to the respective ends of said rollers; other gear means fixedly connected with said inner race member adjacent to the ends of said rollers, the pitch lines of said ring gears and said other gears being substantially coincident with the projections of the bearing surfaces of said outer race member and said inner race member respectively; and a gear wheel fixedly connected with each end of each bearing roller, each of said gear wheels meshing with a said ring gear and a said other gear and thus providing axial alignment and annular spaced relation of said pairs of rollers.

10. In a roller bearing, the combination of elements comprising races providing two annular coaxial inclined bearing chambers positioned with their larger ends adjacent to each other and their smaller ends toward the respective ends of the bearing; tapered bearing rollers positioned in pairs in said bearing chambers with their larger ends adjacent to and in rolling contact with each other and the axes of the two rollers of each pair positioned in the same axial plane of the bearing; gear means interconnecting said rollers with said races; flanges on said rollers near the larger ends thereof extending axisward and peripheryward beyond the projected surface of said rollers; and mating flanges on said races extending axisward and peripheryward beyond the projected surfaces of said races and positioned for engagement with said roller flanges, the thrust portions of the roller flanges which engage with the race flanges receding away from the race flanges and away from the plane of the ring of contact of the roller flanges and race flanges outwardly from said ring of contact and in a direction peripheryward from the projected bearing surfaces of the rollers, whereby rubbing contact between said race flanges and said roller flanges as they move together and apart is avoided.

FRANK ELLISON BEST.